(No Model.)
J. E. REGISTER.
DENTAL FLASK.
No. 428,139. Patented May 20, 1890.
Fig. 1.
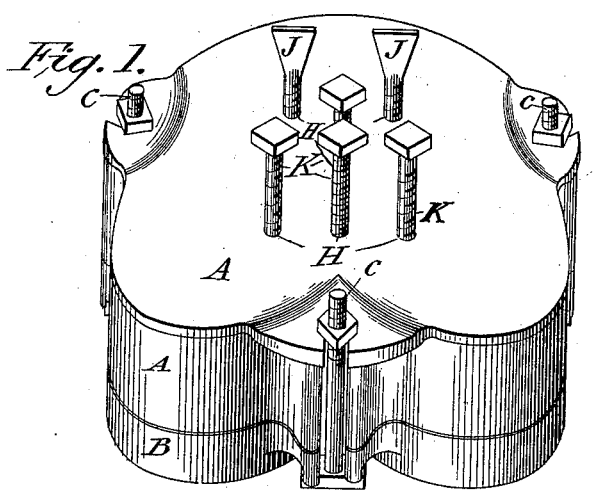
Fig. 2.
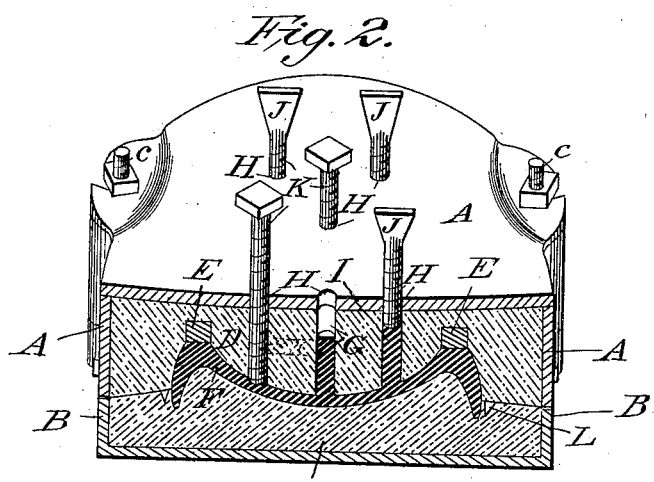
Fig. 3.    Fig. 4.
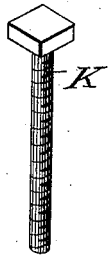 
Witnesses:
Thos. F. Dunn
D. C. Montgomery Jr.
Inventor:
John E. Register

UNITED STATES PATENT OFFICE.

JOHN E. REGISTER, OF DOVER, DELAWARE.

DENTAL FLASK.

SPECIFICATION forming part of Letters Patent No. 428,139, dated May 20, 1890.

Application filed March 10, 1890. Serial No. 343,403. (No model.)

*To all whom it may concern:*

Be it known that I, JOHN E. REGISTER, a citizen of the United States, residing at Dover, in the county of Kent and State of Delaware, have invented a certain new and useful Improvement in Dental Flasks, of which the following is a specification, reference being had therein to the accompanying drawings.

This invention relates to a certain new and useful improvement in dental flasks for manufacturing dental vulcanite rubber plates with artificial teeth attached thereto.

It has for its object, when the upper and lower sections of the flask, which have been previously packed in the customary manner with excess of dental vulcanite rubber, are being brought together, to provide means whereby the excess of rubber can easily escape from the central part of the flask, thereby lessening the danger of too great a pressure on the artificial teeth and on the plaster model.

In the accompanying drawings, forming a part of this specification, and on which like letters of reference indicate the same or corresponding features, Figure 1 represents a perspective view of a dental flask, showing the vent making and stopping screw-bolts in position. Fig. 2 represents a transverse sectional view of said flask, and representing dental vulcanite rubber and an artificial set of teeth embedded in plaster-of-paris therein, also showing vents in the flask for allowing the escape of the excess of the rubber with vent making and stopper bolts in position and one vent open. Fig. 3 is a view of one the vent-making bolts. Fig. 4 is a view of one of the vent-stopper bolts.

A represents the top section of the flask, and B the bottom section, the two sections being held together by the screw-bolts C.

D represents plaster-of-paris that has set, partially filling the upper section of the flask.

M represents plaster-of-paris that has set, partially filling the lower section of the flask.

E represents artificial teeth embedded in the plaster-of-paris, and F dental vulcanite rubber filling a cavity between the upper and lower sections of the flask and attaching the artificial teeth.

G represents a vent in the plaster-of-paris, (shown as being open,) communicating from the outside through the opening in the top of the flask H with rubber F, and also showing the manner of escape of the excess of rubber by the latter flowing up into it from the cavity.

I represents a vent partially filled with the excess of rubber from the cavity and closed at top by the stopper-bolt J.

K represents the vent-making bolts in position at the time the upper and lower sections of the flask, having an excess of rubber between them in the cavity, are being brought together.

L represents sluices for the escape of an excess of rubber on the sides.

The manner of operation is as follows: A set of artificial teeth, mounted on wax or some other suitable substance, is placed in the lower section of the flask in the customary manner. Afterward freshly-mixed plaster-of-paris is run into the upper section of the flask A, the latter first having been placed in position on top of the lower section of the flask B, and before the last-named plaster sets or becomes hard the bolts K are run into and through all the holes H in the top of the flask down through the then soft plaster-of-paris until they touch the wax plate, and are allowed to remain in that position until the plaster-of-paris sets and becomes hard, after which the flask is taken apart and rubber to excess is substituted for the wax, when the two sections of the flask are brought partially together by the bolts C, and as soon as the pressure begins to get heavy on the bolts C, caused by the excess of rubber in the flask having no way to easily escape, all the bolts K are removed from the flask, leaving the vents open, as shown at G and H, after which continued pressure is exerted on the bolts C until the two sections of the flask come completely together, the excess of rubber in the cavity in the meantime escaping by way of and through the open vents. As soon as the two sections of the flask are completely together the vents have screwed into them the bolts J, in manner and form as shown at I. If the excess of rubber should bulge out at H, sufficient of it can be easily removed to admit of the bolts J being placed in position. If there should be but a small excess of rubber, the bolts K need not be removed entirely from their positions, as shown but gradually raised a short distance from the rubber in the cavity. This will cause a small cavity in the plaster immediately below the points of the bolts K, into which the small excess of rubber will flow.

Having thus fully described my invention, what I claim as my invention, and desire to secure by Letters Patent, is—

The combination, in a dental flask having the sections A B, the former provided with vent-holes H, of the vent-making bolts K and the stopper-bolts J, the former adapted to be projected through the plaster-of-paris in the section A into the rubber cavity in said flask, and the latter, after the removal of said bolts K, to partially fill the vent and permit the excess of rubber in the flask to pass into said vents, substantially as and for the purpose set forth.

In testimony that I claim the foregoing as my own I have hereto affixed my signature in presence of two witnesses.

JOHN E. REGISTER.

Witnesses:
D. C. MONTGOMERY, Jr.,
THOS. F. DUNN.